US011203821B2

(12) United States Patent
Kim

(10) Patent No.: US 11,203,821 B2
(45) Date of Patent: Dec. 21, 2021

(54) WOVEN PATTERN HOUSING AND ELECTRONIC DEVICE USING THE SAME

(71) Applicant: SAMSUNG ELECTRONICS CO., LTD., Suwon-si (KR)

(72) Inventor: Hyunsook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 16/378,678

(22) Filed: Apr. 9, 2019

(65) Prior Publication Data

US 2019/0316278 A1    Oct. 17, 2019

(30) Foreign Application Priority Data

Apr. 11, 2018 (KR) .................. 10-2018-0041978

(51) Int. Cl.
| | |
|---|---|
| *D06M 15/564* | (2006.01) |
| *D03D 15/00* | (2021.01) |
| *D03D 13/00* | (2006.01) |
| *D02G 3/36* | (2006.01) |
| *D02G 3/44* | (2006.01) |
| *D02G 3/02* | (2006.01) |

(52) U.S. Cl.
CPC .............. *D02G 3/441* (2013.01); *D02G 3/02* (2013.01); *D02G 3/36* (2013.01); *D03D 13/004* (2013.01); *D03D 15/00* (2013.01); *D06M 15/564* (2013.01); *C08J 2375/04* (2013.01); *D10B 2401/18* (2013.01)

(58) Field of Classification Search
None
See application file for complete search history.

(56) References Cited

U.S. PATENT DOCUMENTS

| | | | | |
|---|---|---|---|---|
| 5,652,057 | A | * | 7/1997 | Delker ...................... D01F 8/14 428/373 |
| 6,411,353 | B1 | | 6/2002 | Yarita et al. |
| 9,674,325 | B1 | | 6/2017 | Coverstone et al. |
| 2002/0101738 | A1 | | 8/2002 | Misaras |
| 2004/0257515 | A1 | | 12/2004 | Lee |
| 2008/0166511 | A1 | | 7/2008 | Honma et al. |
| 2010/0020295 | A1 | | 1/2010 | Yang et al. |
| 2010/0147444 | A1 | | 6/2010 | Hsu et al. |

(Continued)

FOREIGN PATENT DOCUMENTS

| | | |
|---|---|---|
| CN | 101636049 A | 1/2010 |
| CN | 101824205 A | 9/2010 |

(Continued)

OTHER PUBLICATIONS

Extended European Search Report and Written Opinion dated Oct. 16, 2020 in corresponding European Application No. 19784238.8.

(Continued)

*Primary Examiner* — Shawn Mckinnon
(74) *Attorney, Agent, or Firm* — Nixon & Vanderhye P.C.

(57) ABSTRACT

A housing of an electronic device according to various embodiments may include a woven material including TPU yarns, and a light emission module comprising light emitting circuitry, wherein light emitted from the light emission module may be directly transmitted through the woven material to display at least one piece of information about the electronic device.

18 Claims, 17 Drawing Sheets

(56) References Cited

U.S. PATENT DOCUMENTS

| | | |
|---|---|---|
| 2014/0045558 A1 | 2/2014 | Kim |
| 2015/0024811 A1 | 1/2015 | Yoon et al. |
| 2015/0342307 A1* | 12/2015 | Weber ..................... D03D 1/00 368/282 |
| 2017/0060190 A1 | 3/2017 | Hegde et al. |
| 2017/0095043 A1* | 4/2017 | Weber ..................... D03D 1/00 |
| 2017/0178840 A1* | 6/2017 | Hegde .................. G06F 3/0202 |
| 2017/0249040 A1 | 8/2017 | Kim et al. |
| 2018/0366813 A1 | 12/2018 | Kim et al. |

FOREIGN PATENT DOCUMENTS

| | | |
|---|---|---|
| CN | 203482519 U | 3/2014 |
| CN | 104605601 | 5/2015 |
| CN | 105378168 A | 3/2016 |
| JP | 2004-213021 | 7/2004 |
| KR | 10-0221958 | 6/1999 |
| KR | 10-2009-0035200 A | 4/2009 |
| KR | 10-0998639 | 12/2010 |
| KR | 10-2013-0122881 A | 11/2013 |
| KR | 10-1680627 | 11/2016 |
| WO | WO 2017/039836 A1 | 3/2017 |

OTHER PUBLICATIONS

International Search Report dated Jul. 9, 2019, issued in International Application No. PCT/KR2019/004137.

Written Opinion of the International Searching Authority dated Jul. 9, 2019, issued in International Application No. PCT/KR2019/004137.

International Search Report and Written Opinion dated Jan. 8, 2021 in corresponding International Application No. PCT/KR2020/013217.

Chinese Office Action dated Aug. 17, 2021 for CN Application No. 201980012351.5.

\* cited by examiner

WOVEN PATTERN HOUSING AND ELECTRONIC DEVICE USING THE SAME

CROSS-REFERENCE TO RELATED APPLICATION

The present application is based on and claims priority under 35 U.S.C. § 119 to Korean patent application number 10-2018-0041978, filed on Apr. 11, 2018, in the Korean Intellectual Property Office, the disclosure of which is incorporated by reference herein in its entirety.

BACKGROUND

1) Field

The disclosure relates to a woven pattern housing and an electronic device using the same.

2) Description of Related Art

In an electronic device such as a smart phone or an AI speaker, a thermoplastic polyurethane (TPU) yarn may be used to fabricate a housing (e.g., a cover or an exterior material) of the electronic device.

In the case of a TPU cover that includes a lighting module, a user is able to view simple information (e.g., time information, message information, alarm information, battery information, etc.) without opening the TPU cover. In this case, the TPU cover may provide information visibility by being fabricated in a flat shape in which a translucent ink (e.g., PU ink) is thinly coated on a transparent film (e.g., a TPU film), but may have restrictions in representing texture on the exterior thereof. For example, when a TPU yarn weaving technique is applied, it is possible to provide a sensation of a woven feeling that cannot be felt in a flat-shaped housing, or to implement multiple colors depending on a weaving method. However, since the light emitted from a light emission module is not naturally (directly) transmitted to the outside, the readability of information provided through the TPU cover may be deteriorated.

The above information is presented as background information only to assist with an understanding of the disclosure. No determination has been made, and no assertion is made, as to whether any of the above might be applicable as prior art with regard to the disclosure.

SUMMARY

According to various example embodiments of the disclosure, a housing of an electronic device may include a woven material including TPU yarns, and a light emission module comprising light emitting circuitry, wherein light emitted from the light emission module may be directly transmitted through the woven material to display at least one piece of information about the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
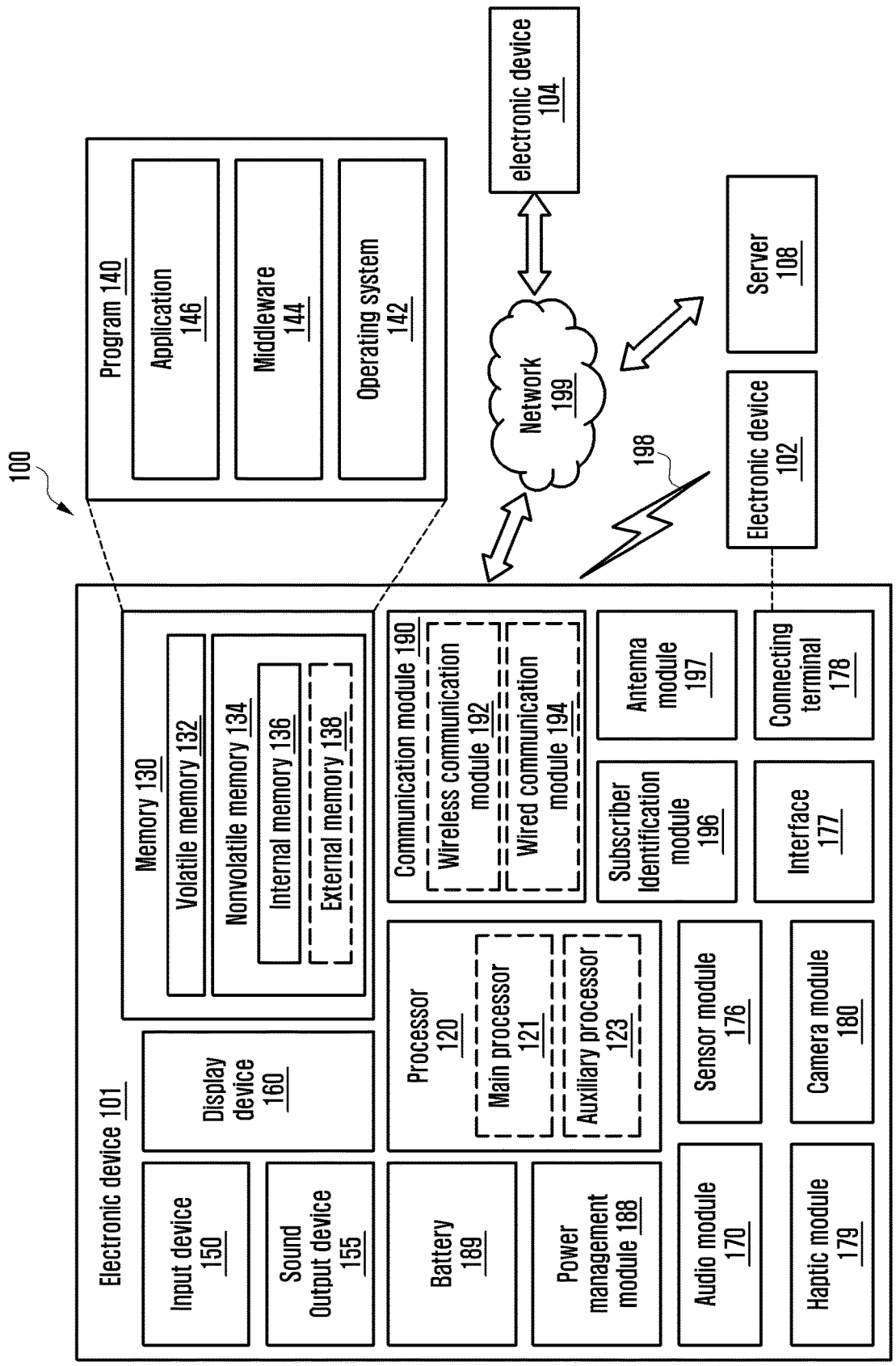
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations (e.g., and/or) of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
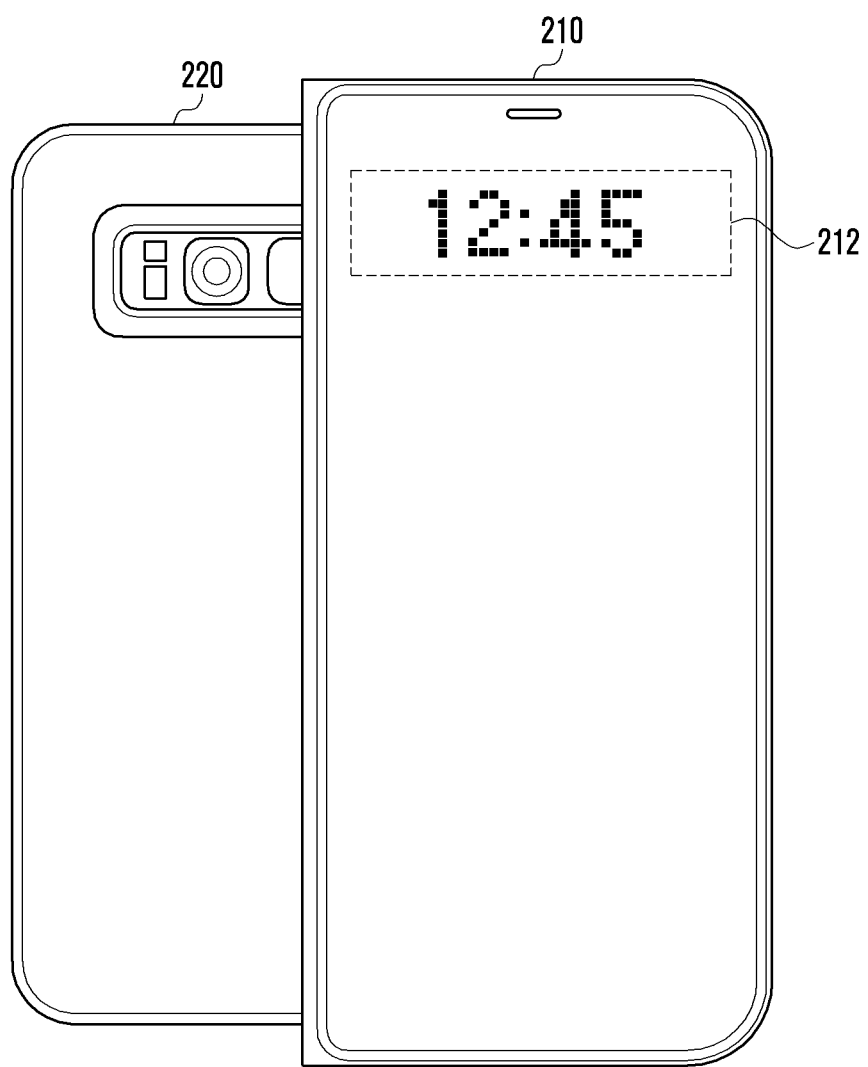
FIG. 2A is a diagram illustrating an example flat TPU cover according to various embodiments.

FIG. 2A is a diagram illustrating an example flat TPU cover according to various embodiments.

According to various embodiments, FIG. 2A illustrates an electronic device 101 in the state of being provided with a cover (e.g., an LED view cover) (e.g., a front surface 210 of a cover and a rear surface 220 of a cover). An information display region 212 may be located on the front surface 210 of the cover and information on, for example, and without limitation, at least one of time, a message, an alarm, battery information, or the like, may be displayed by a light emission module mounted on the cover. For example, the material of the cover may be fabricated by thinly coating a translucent ink on a transparent polyurethane (PU) film. In this case, since the method in which the light emission module passes through the material of the cover is used, the exterior appearance of the cover may be concisely processed in a flat surface or a shape similar to a flat surface in order to provide visibility of information.

Figure 2B:
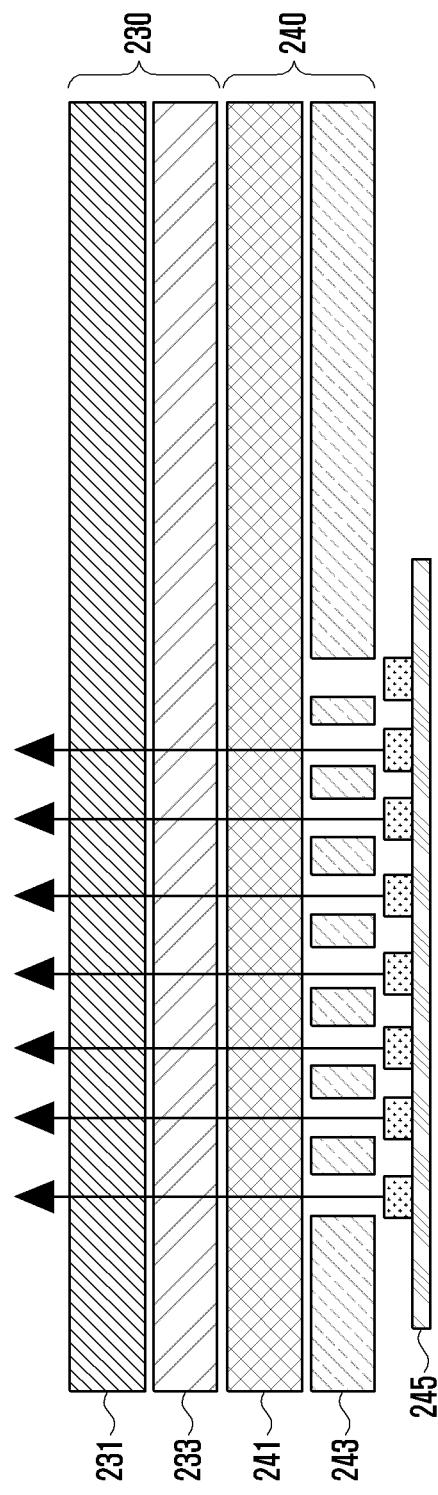
FIG. 2B is a diagram illustrating a cross section of the example flat TPU cover according to various embodiments.

FIG. 2B is a diagram illustrating a cross section of the example flat TPU cover according to various embodiments.

According to various embodiments, FIG. 2B illustrates a cross section of the cover shown in FIG. 2A. The cover of the electronic device 101 includes a PU ink 231, a TPU film skin 233, hot melt 241, an injection-molded product 243, and a light emission module (e.g., including light emitting circuitry) 245 in this order from the top. For example, the PU ink 231 may be translucent, and the TPU film skin 233 may be transparent. The injection-molded product 243 may be a material having rigidity such that the cover is not easily bent, and may have fine holes such that the light of the light emission module 245 can pass therethrough. The hot melt 241 may be an adhesive that prevents (and/or reduces a likelihood that) the injection-molded product 243 and the TPU film skin 233 from being separated from each other in a bonded state. Accordingly, the cover may be divided into an outer appearance region 230 that exhibits appearance characteristics (e.g., color, texture and the like) and a base region 240 that supports the shape of the cover. Since the cover having the shape illustrated in FIGS. 2A and 2B is a cover having a simple shape, it is insufficient to emphasize an emotive aspect to a user.

Figure 3A:
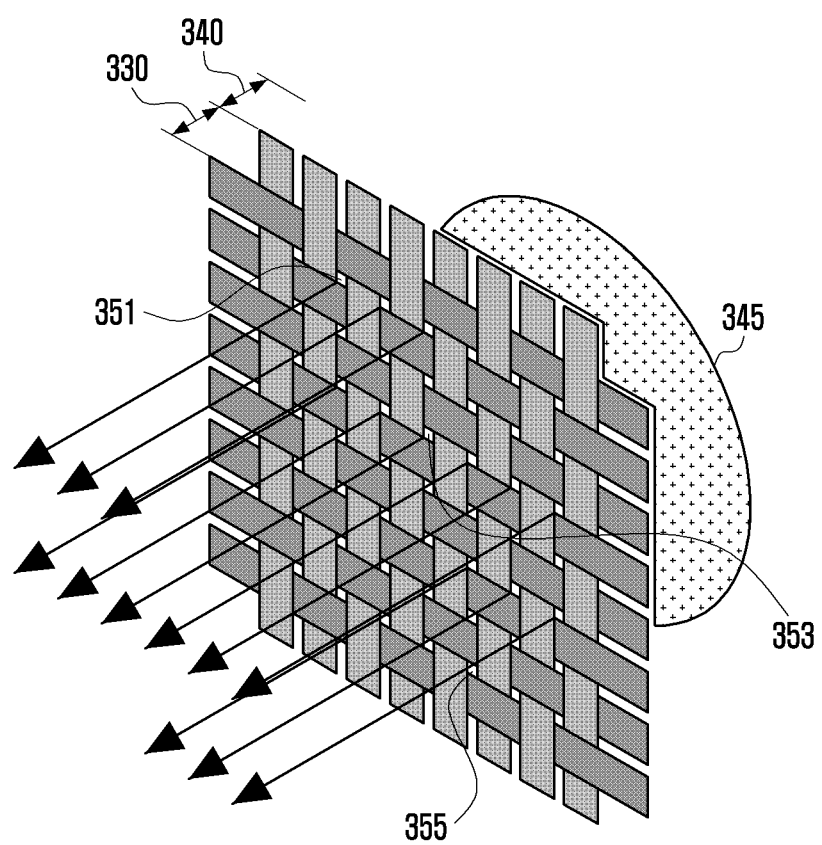
FIG. 3A is a diagram illustrating an example TPU material in a woven pattern using a polyfilament-based TPU yarn according to various embodiments.
Figure 3B:
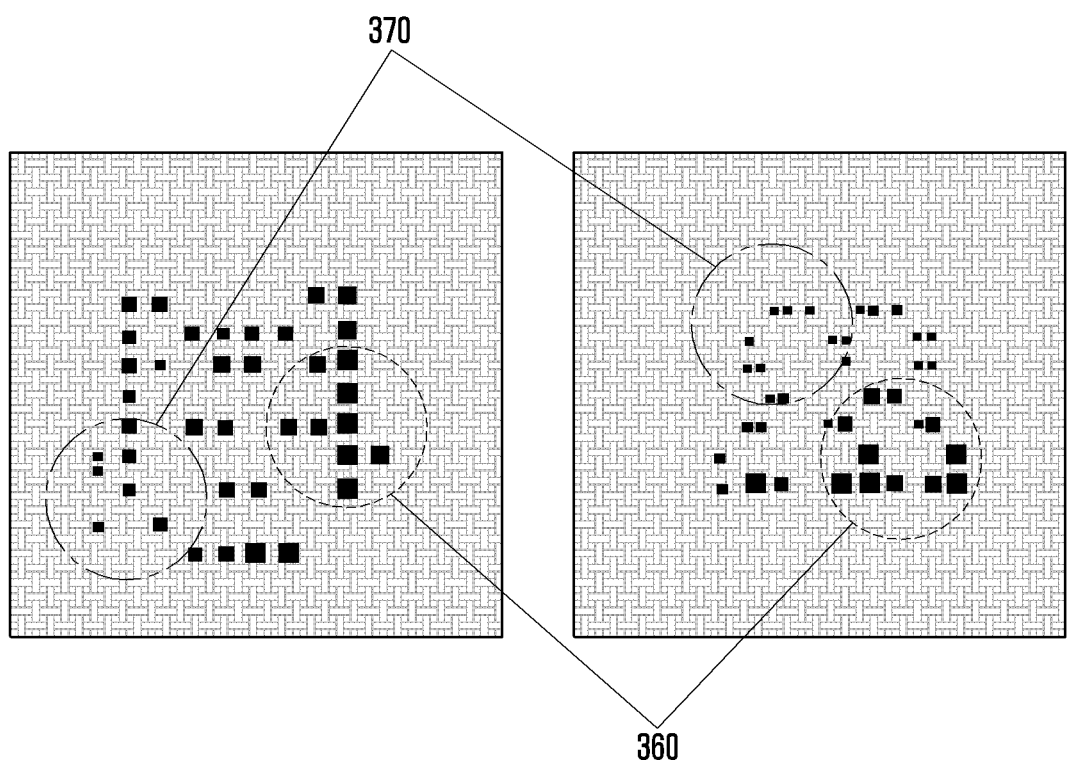
FIG. 3B is a diagram illustrating an example TPU material in a woven pattern using a polyfilament-based TPU yarn according to various embodiments.
Figure 3C:
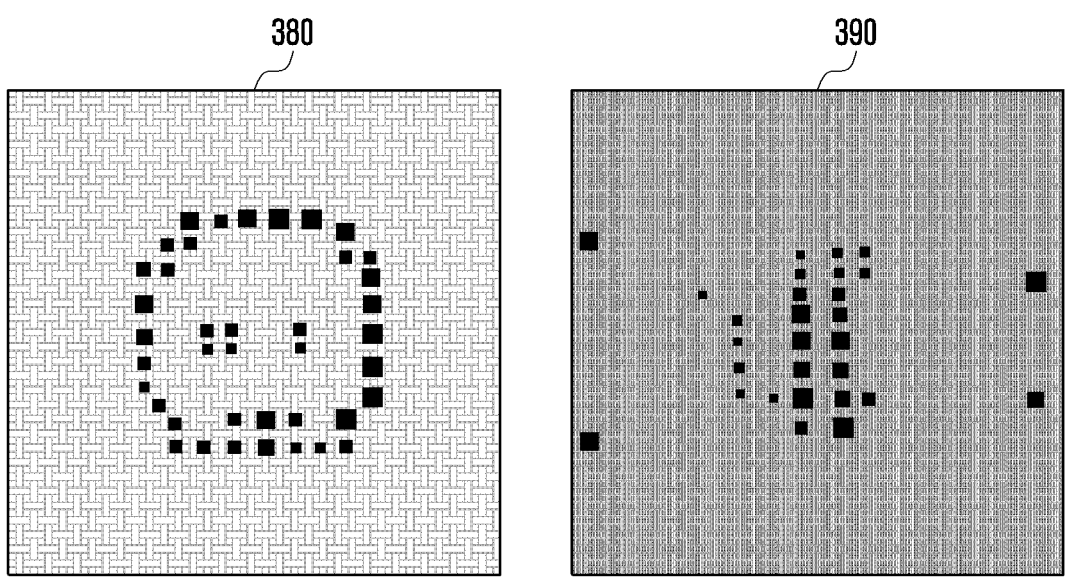
FIG. 3C is a diagram illustrating an example TPU material in a woven pattern using a polyfilament-based TPU yarn according to various embodiments.

FIGS. 3A, 3B and 3C are diagrams each illustrating a TPU material in a woven pattern using a polyfilament-based TPU yarn according to various embodiments.

According to various embodiments, FIG. 3A may be a cover in which a weave pattern is applied in to add a more emotive element to the cover of the electronic device of FIG. 3A. Similarly, the woven pattern cover may include an outer appearance region 330 that exhibits appearance characteristics and a base area 340 that supports the shape of the cover, and may be provided with a light emission module 345 that emits light. For example, a woven pattern cover may be advantageous in that the TPU yarns are woven to provide a warm emotive quality. However, in the case of a TPU yarn-woven material, it may be difficult for the light emitted from the light emission module 345 to pass through the woven material because the TPU yarns, which are poor in transparency, are alternately arranged. For example, even if light is emitted from the light emission module 345, most of the emitted light may leak through voids 351, 353, and 355 that may occur due to the characteristics of the woven material. For example, since the smoothness of the woven material is low due to unevenness in size of holes between the woven yarns and in cross section of the woven material due to the weaving method, the light may be scattered when passing through the woven material. Thus, since the light transmittance differs for each hole in the woven material, light may not evenly pass through the cover, the readability of information provided by the cover may be remarkably deteriorated.

According to various embodiments, as illustrated in FIG. 3B, a problem in information readability may be caused due to unevenness in size of the holes of and in cross-section of the woven material described with reference to FIG. 3A. For example, a relatively large amount of light can be transmitted in a portion 360 in which the size of holes is large or the spacing of TPU yarns is wide. As another example, a relatively small amount of light can be transmitted in a portion 370 in which the size of holes is small or the spacing of TPU yarns is narrow. Accordingly, since the light cannot penetrate evenly due to the characteristics of the weaving method, the readability of information provided to the user may be remarkably deteriorated.

According to various embodiments, the readability of information provided to the user may vary depending on the color of the woven material (e.g., brightness of color). Since the light emitted from the light emission module 345 does not directly pass through the material, there may be a difference in light illumination depending on the color of the material. For example, referring to reference numeral 380 in FIG. 3C, in a bright material, since light illumination may be provided by a certain level or more, a readability of information may be maintained. As another example, referring to reference numeral 390 in FIG. 3C, in a dark material, since almost no light illumination is provided, it may be difficult to know what kind of information is provided.

Figure 4A:
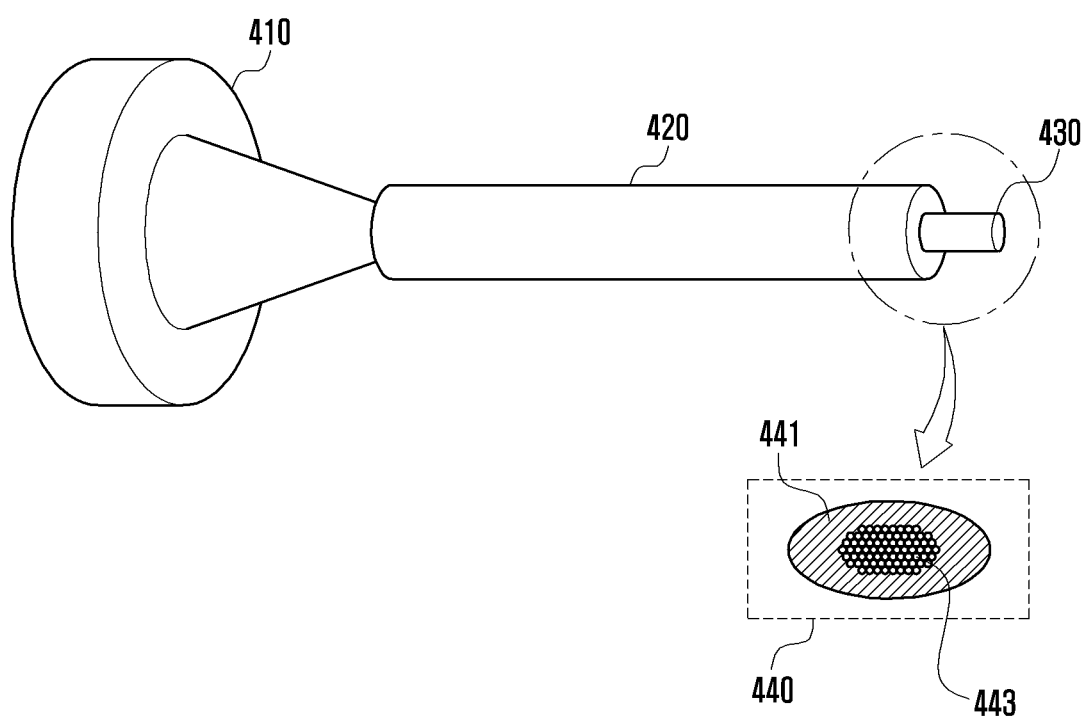
FIG. 4A is a diagram illustrating an external appearance and a cross section of an example polyfilament-based TPU yarn according to various embodiments.
Figure 4B:
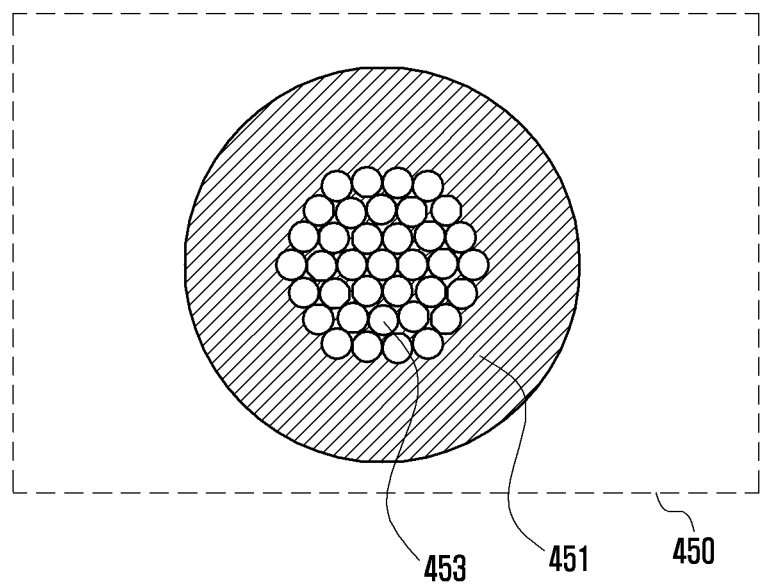
FIG. 4B is a diagram illustrating a cross section of an example polyfilament-based TPU yarn according to various embodiments.

FIGS. 4A and 4B are diagrams illustrating an external appearance and a cross section of an example polyfilament-based TPU yarn according to various embodiments;

According to various embodiments, FIGS. 4A and 4B illustrate an example TPU coated yarn in which a core formed using polyfilaments is coated with TPU. For example, the TPU yarns may be produced by connecting a core 430 to a die 410 and coating TPU 420 on the connected core 430. For reference, when a TPU yarn is produced, it is possible to adjust the brightness, saturation, color, and so on of the TPU yarn by adjusting the amount, color, and so on of coated TPU. Referring to cross sections 440 and 450 of TPU yarns, it can be seen that the TPU yarns including TPU coating 441 and 451 and the polyfilaments 443 and 453. For example, in the case of using the polyfilaments 443 and 453 in the core 430, light may be scattered without being transmitted directly due to the opacity of the core.

Figure 5A:
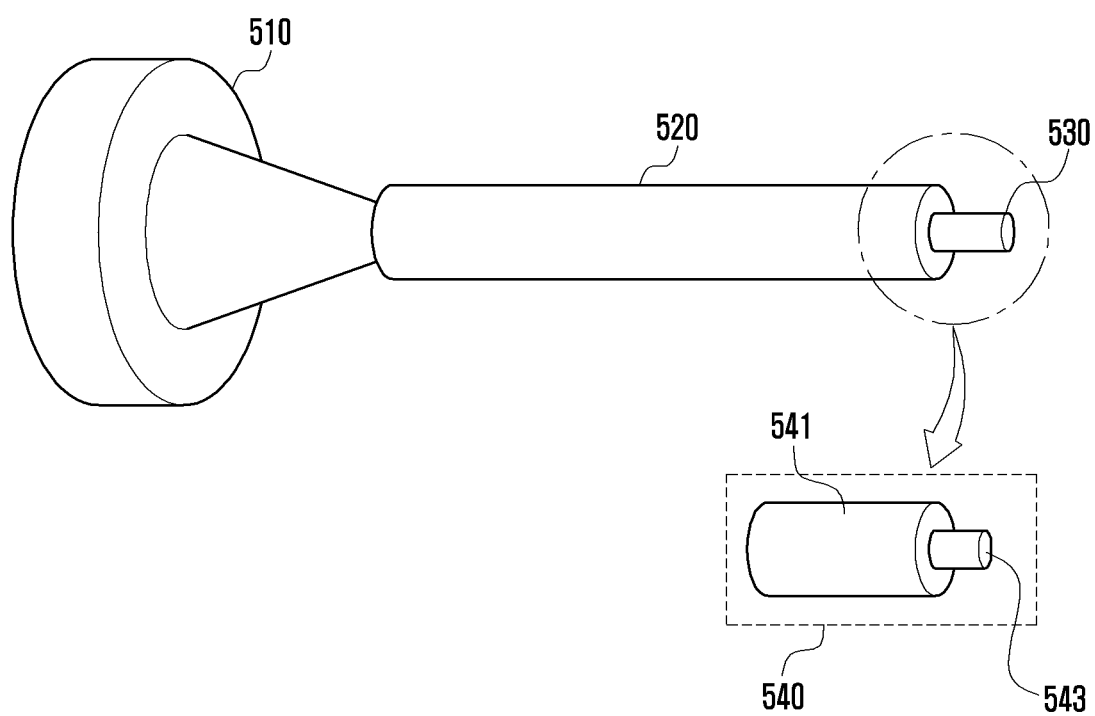
FIG. 5A is diagram illustrating an external appearance of an example monofilament-based TPU yarn according to various embodiments.

FIG. 5A is diagram illustrating an external appearance of an example monofilament-based TPU yarn according to various embodiments.

According to various embodiments, FIG. 5A illustrates an example TPU coated yarn in which a core formed using a monofilament is coated with TPU. For example, a core 530 may be connected to a die 510, and TPU 520 may be coated on the connected core 530 to produce a TPU yarn. Referring to an area 540 of the TPU yarn, it can be seen that the TPU yarn includes TPU coating 541, and a monofilament 543. For example, in the case of using the monofilament 543 in the core 530, light can be directly transmitted through the TPU yarn due to the transparency of the core. This makes it possible to address the readability problem of woven materials fabricated using polyfilament-based TPU yarns.

Figure 5B:
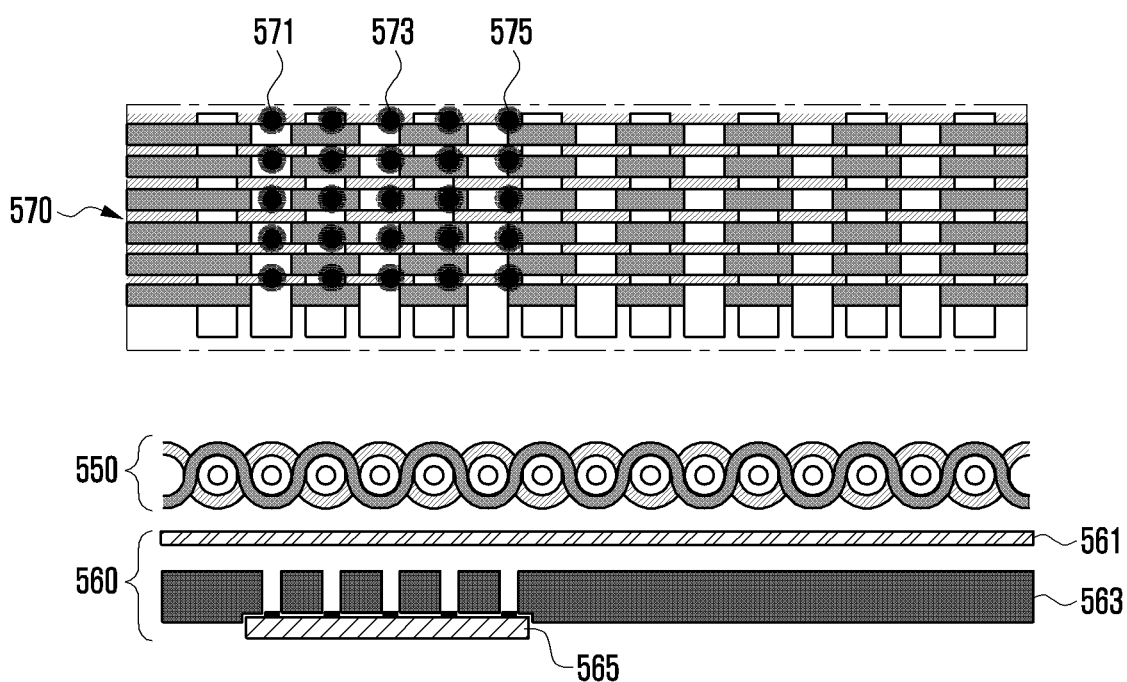
FIG. 5B is a diagram illustrating an example woven pattern TPU cover using a monofilament-based TPU yarn according to various embodiments.

FIG. 5B is a diagram illustrating an example woven pattern TPU cover using a monofilament-based TPU yarn according to various embodiments.

According to various embodiments, FIG. 5B illustrates a cover 570 fabricated using a woven material produced using monofilament-based TPU yarns. The cover 570 may include an outer appearance region 550 that exhibits appearance characteristics and a base region 560 that supports the shape of the cover (e.g., hot melt 561 and an injection-molded product 563), and may be provided with a light-emission module 565 configured to emit light. Since the monofilament-based TPU yarns are used for the cover 570, the light transmittance may be excellent even if the weaving method is used. For example, the readability of information provided by the cover 570 may be very good due to the light 571 and 573 passing through the bodies of the TPU yarns as well as the light 575 emitted through the holes produced due to the weaving method. Accordingly, the cover 570 is able to provide warm sensibility of the woven material and to improve the readability of information.

Figure 5C:
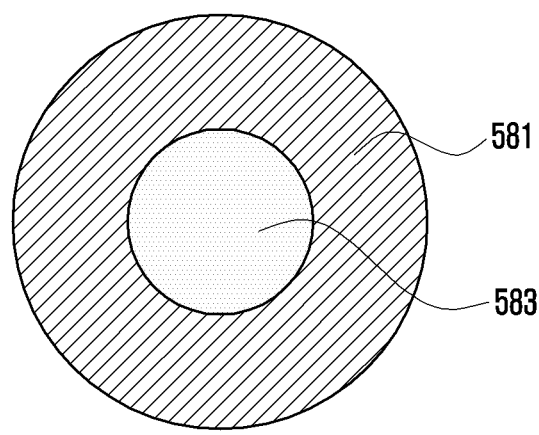
FIG. 5C is diagram illustrating a cross section of an example monofilament-based TPU yarn according to various embodiments.

FIG. 5C is diagram illustrating a cross section of an example monofilament-based TPU yarn according to various embodiments.

According to various embodiments, as can be seen from the cross section of the TPU yarn illustrated in FIG. 5C, the TPU yarn includes TPU coating 581 and a monofilament 583. For example, since the monofilament 583 is used for the core, the light is directly transmitted without scattered, so that the smoothness can be maintained.

Figure 6A:
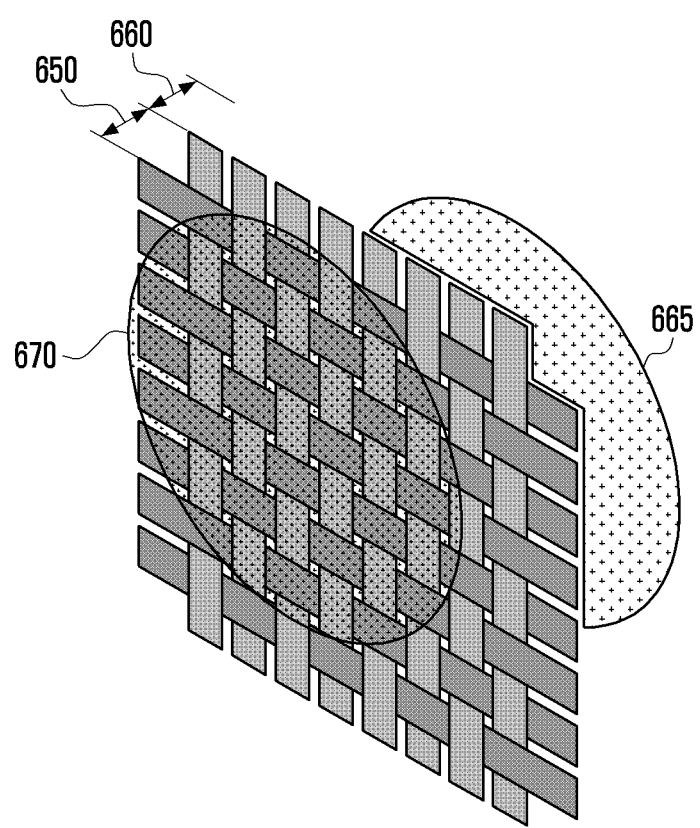
FIG. 6A is a diagram illustrating an example woven pattern TPU material fabricated using a monofilament-based TPU yarn according to various embodiments.
Figure 6B:
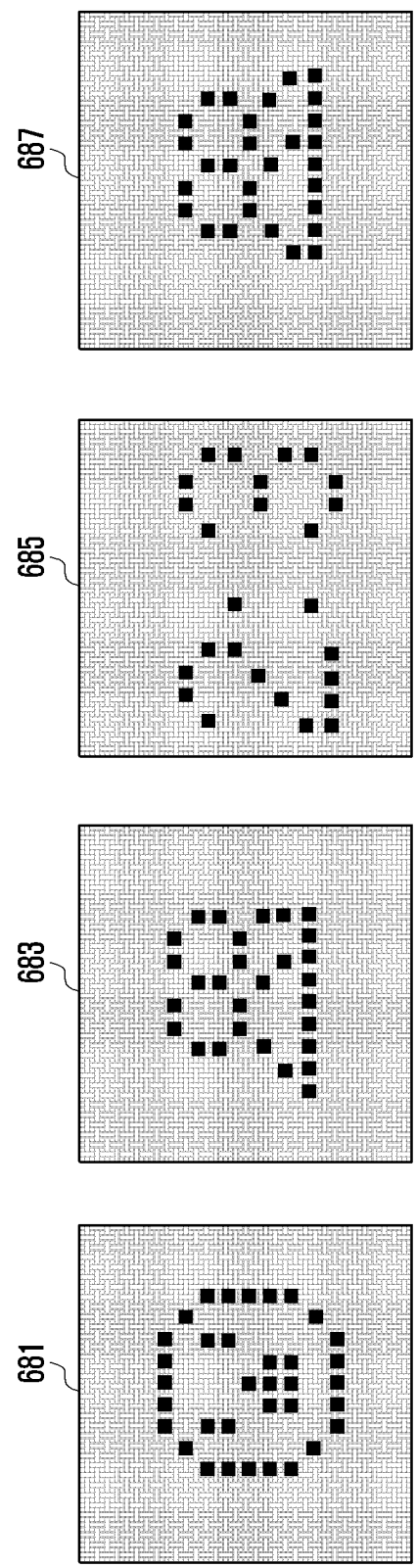
FIG. 6B is a diagram illustrating an example woven pattern TPU material fabricated using a monofilament-based TPU yarn according to various embodiments.

FIGS. 6A and 6B are diagrams each illustrating an example woven pattern TPU material fabricated using a monofilament-based TPU yarn according to various embodiments.

FIGS. 6A and 6B show that a cover fabricated using a woven material of mono-type TPU yarns transmits light evenly. The cover may include an outer appearance region 650 that exhibits appearance characteristics and a base area 660 that supports the shape of the cover, and may be provided with a light emission module 665 that emits light. Since the monofilament-based TPU yarns are used for the cover, the light transmittance may be excellent even if the weaving method is used. Accordingly, the light 670 emitted from the light emission module 665 can be evenly transmitted through the cover. For example, referring information display regions 681, 683, 685, and 687 in FIG. 6B, it can be seen that light is evenly transmitted regardless of the holes or the spacing between TPU yarns in the woven material, and the readability of information is excellent.

FIGS. 7A, 7B, 7C and 7D are diagrams each illustrating an example method of utilizing a woven pattern TPU material using a monofilament-based TPU yarn according to various embodiments as a housing of an electronic device.

According to various embodiments, FIGS. 7A, 7B, 7C and 7D illustrate an embodiment utilizing various kinds of woven materials produced using monofilament-based TPU yarns. Although embodiments applied to the cover of the electronic device 101 have been described with reference to FIGS. 2A, 2B, 3A, 3B, 3C, 4A, 4B, 5A, 5B, 5C, 6A and 6B, a woven material fabricated using monofilament-based TPU yarns may also be applied to a housing forming the outer appearance of an electronic device 101. For example, the various embodiments disclosed herein may be utilized in various electronic devices to emphasize the emotive quality in the region that displays information.

Figure 7A:
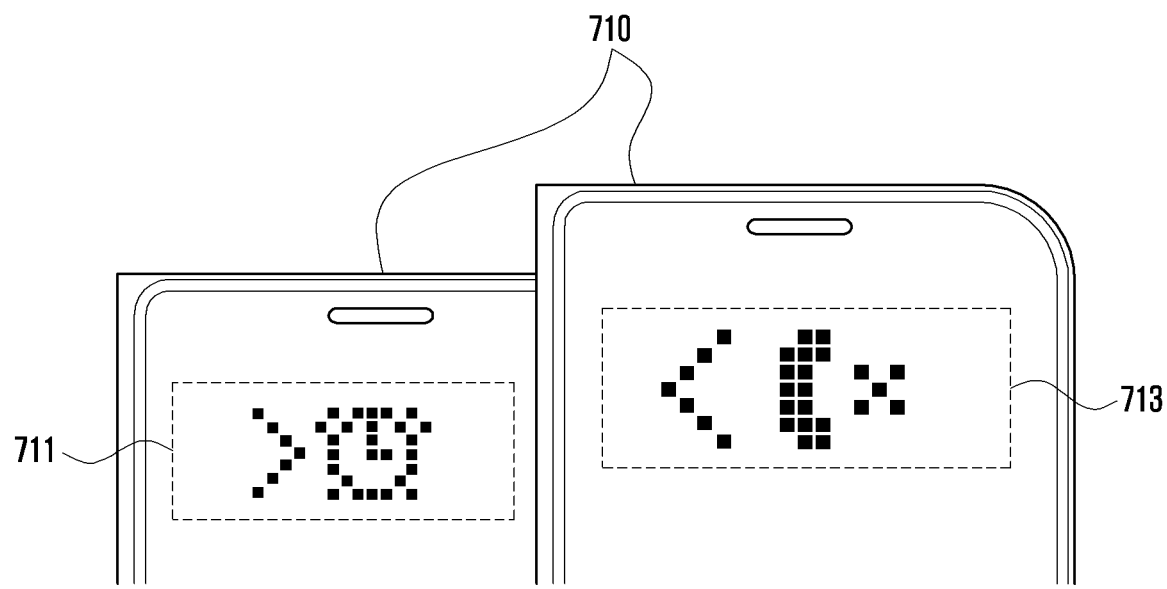
FIG. 7A is a diagram illustrating an example method of utilizing a woven pattern TPU material using a monofilament-based TPU yarn according to various embodiments as a housing of an electronic device.

According to various embodiments, referring to FIG. 7A, a front cover 710 of a smart phone, which is fabricated using a woven material of monofilament-based TPU yarns, is capable of displaying alarm information 711 and/or call information 713 in the information display region.

Figure 7B:
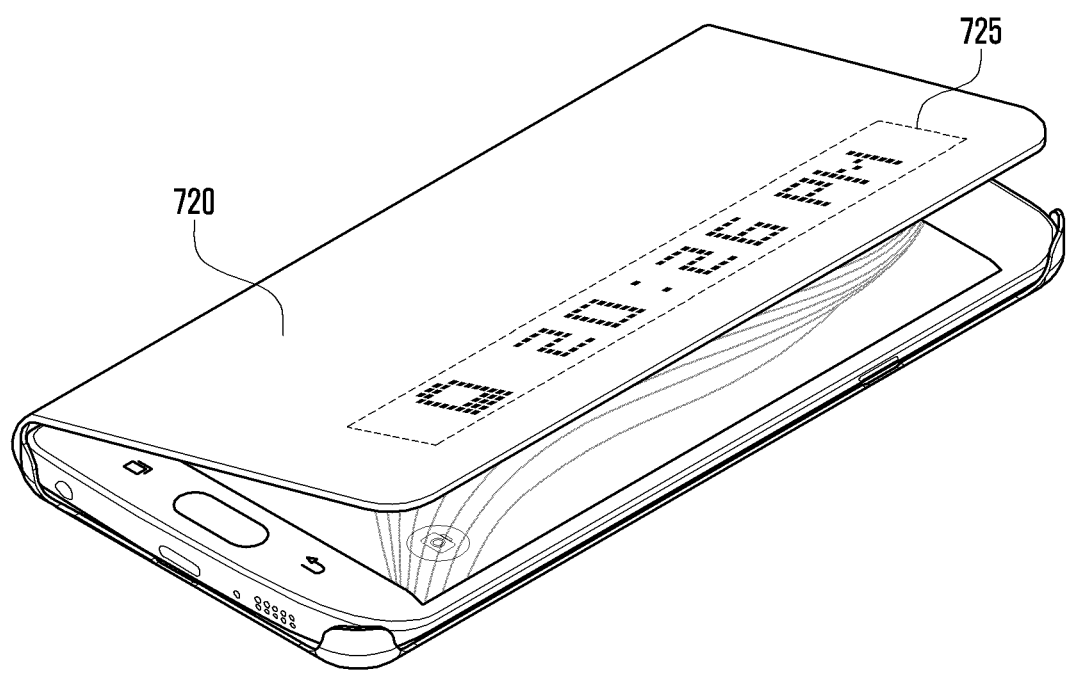
FIG. 7B is a diagram illustrating an example method of utilizing a woven pattern TPU material using a monofilament-based TPU yarn according to various embodiments as a housing of an electronic device.

According to various embodiments, referring to FIG. 7B, a cover 720 of a tablet PC, which is fabricated using a woven material of monofilament-based TPU yarns, is capable of displaying battery information and time information in an information display region 725.

Figure 7C:
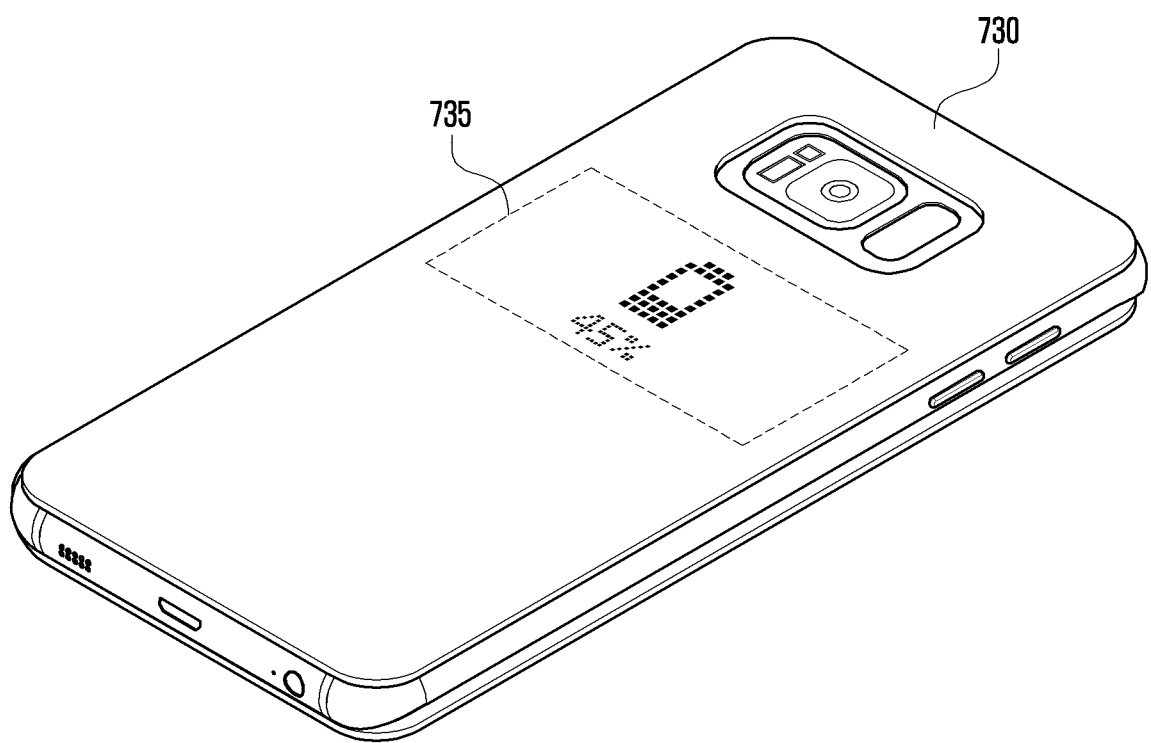
FIG. 7C is a diagram illustrating an example method of utilizing a woven pattern TPU material using a monofilament-based TPU yarn according to various embodiments as a housing of an electronic device.

According to various embodiments, referring to FIG. 7C, a rear cover 730 of a smart phone, which is fabricated using a woven material of monofilament-based TPU yarns, is capable of displaying battery information in an information display region 735. In this case, it is possible to utilize not only the front surface but also the rear surface of the cover, so that more various information can be provided to the user together with the front surface.

Figure 7D:
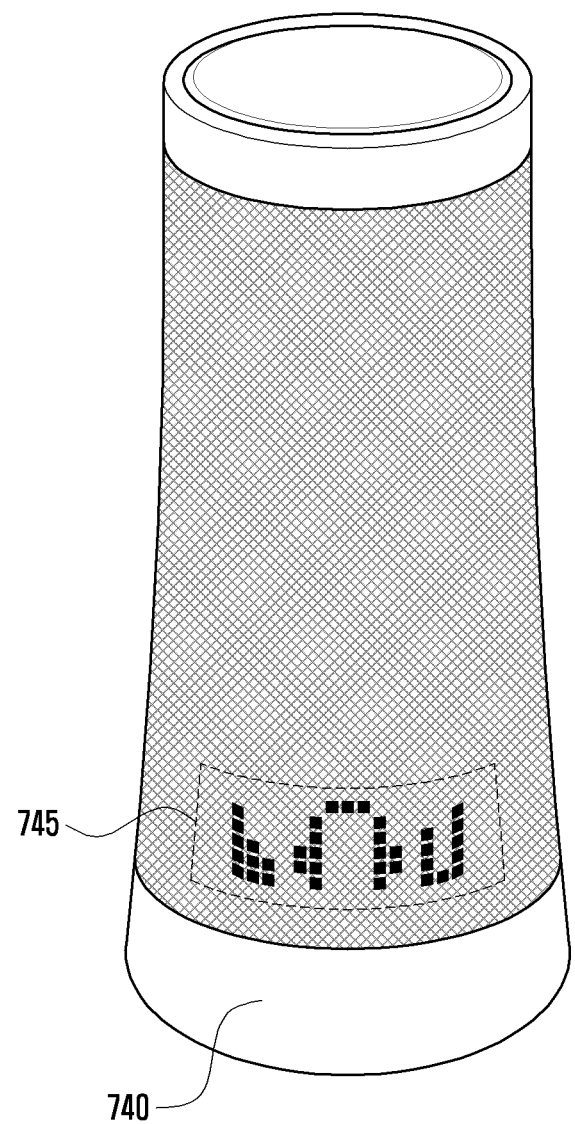
FIG. 7D is a diagram illustrating an example method of utilizing a woven pattern TPU material using a monofilament-based TPU yarn according to various embodiments as a housing of an electronic device.

According to various embodiments, referring to FIG. 7D, a material fabricated using monofilament-based TPU yarns may be utilized as a part or all of the housing of a speaker 740 (e.g., an AI speaker). At least one piece of information related to the contents to be reproduced (e.g., title, playback time, volume, playback status, etc.) may be displayed in an information display area 745 of the speaker 740.

According to various embodiments, the disclosure is capable of providing a user with an emotive quality through a fabric that is comparable to a conventional plastic PU material. In addition, it is possible to suppress the scattering of light generated in the existing TPU-woven material and to improve the readability of light information. The TPU woven material of the disclosure is able to improve the readability of light information regardless of the brightness of color, so that the color of TPU-woven material can be utilized variously.

A housing of an electronic device according to various embodiments may include a woven material in which TPU yarns are woven, and a light emission module, in which light emitted from the light emission module may be directly transmitted through the woven material to display at least one piece of information about the electronic device.

The TPU yarn may be transparent.

The TPU yarn may include a core and TPU coating surrounding the core.

The core may be a monofilament.

The TPU coating may render different brightnesses based on at least one of a transparent liquid phase, a pigment, an opaque additive, and/or carbon black.

The TPU coating may render different saturations based on at least one of a transparent liquid phase, a pigment, an opaque additive, and/or carbon black.

The TPU coating may render different colors based on at least one of a transparent liquid phase, a pigment, an opaque additive, and/or a carbon black.

The monofilament may be R7.

The electronic device may be a smart phone.

The electronic device may be a tablet PC.

The electronic device may be an AI speaker.

The housing may cover the front surface of the electronic device.

The housing may cover the rear surface of the electronic device.

The housing may enclose the periphery of the display device.

The at least one piece of information may include power information of the electronic device.

The at least one piece of information may include time information of the electronic device.

The at least one piece of information may include alarm information of the electronic device.

The at least one piece of information may include call information of the electronic device.

The at least one piece of information may include content reproduction information of the electronic device.

The at least one piece of information may include emoticon information of the electronic device.

While the disclosure has been illustrated and described with reference to various example embodiments, it will be understood that the various example embodiments are intended to be illustrative, not limiting. Accordingly, one of ordinary skill in the art will understand that various changes in form and details may be made without departing from the true spirit and full scope of the disclosure as defined, for example, by the appended claims and equivalents thereof.

What is claimed is:

1. A housing of an electronic device, the housing comprising:
    a woven material comprising a thermoplastic polyurethane (TPU) yarn; and
    a light emission module comprising light emitting circuitry and disposed behind a surface of the woven material formed by overlapping TPU yarn,
    wherein light emitted from the light emission module is directly transmitted through the surface of the woven material to display varying information about the electronic device, and
    the TPU yarn includes a transparent core comprising a monofilament and TPU coating surrounding the core.

2. The housing of claim 1, wherein the TPU coating renders different brightnesses based on at least one of: a transparent liquid phase, a pigment, an opaque additive, and/or carbon black.

3. The housing of claim 1, wherein the TPU coating renders different saturations based on at least one of: a transparent liquid phase, a pigment, an opaque additive, and/or carbon black.

4. The housing of claim 1, wherein the TPU coating renders different colors based on at least one of: a transparent liquid phase, a pigment, an opaque additive, and/or carbon black.

5. The housing of claim 1, wherein the electronic device is a smart phone.

6. The housing of claim 1, wherein the electronic device is a tablet PC.

7. The housing of claim 1, wherein the electronic device is an AI speaker.

8. The housing of claim 1, wherein the housing is configured to cover a front surface of the electronic device.

9. The housing of claim 1, wherein the housing is configured to cover a rear surface of the electronic device.

10. The housing of claim 1, wherein the housing is configured to enclose a periphery of a display of the electronic device.

11. The housing of claim 1, wherein the information includes power information of the electronic device.

12. The housing of claim 1, wherein the information includes time information of the electronic device.

13. The housing of claim 1, wherein the information includes alarm information of the electronic device.

14. The housing of claim 1, wherein the information includes call information of the electronic device.

15. The housing of claim 1, wherein the information includes content reproduction information of the electronic device.

16. The housing of claim 1, wherein the information includes emoticon information of the electronic device.

17. The housing of claim 1, further comprising a base region disposed between the light emission module and the surface of the woven material, and configured to support the shape of the housing.

18. The housing of claim 17, wherein the base region includes an injection-molded product comprising a plurality of openings configured to pass light from the light emission module to the surface of the woven material.

* * * * *